July 18, 1967 E. H. DINGER 3,331,999
ALTERNATING CURRENT VOLTAGE CONTROL ARRANGEMENT
Filed July 3, 1963 7 Sheets-Sheet 1

INVENTOR:
EDWARD H. DINGER,
BY James G. Williams
HIS ATTORNEY.

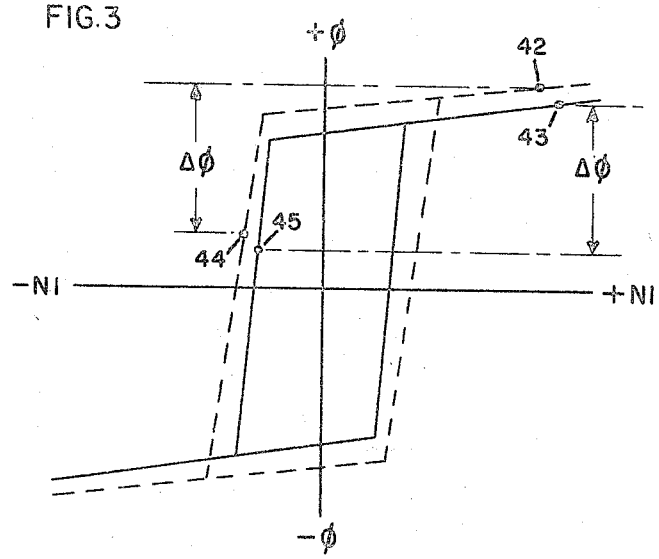
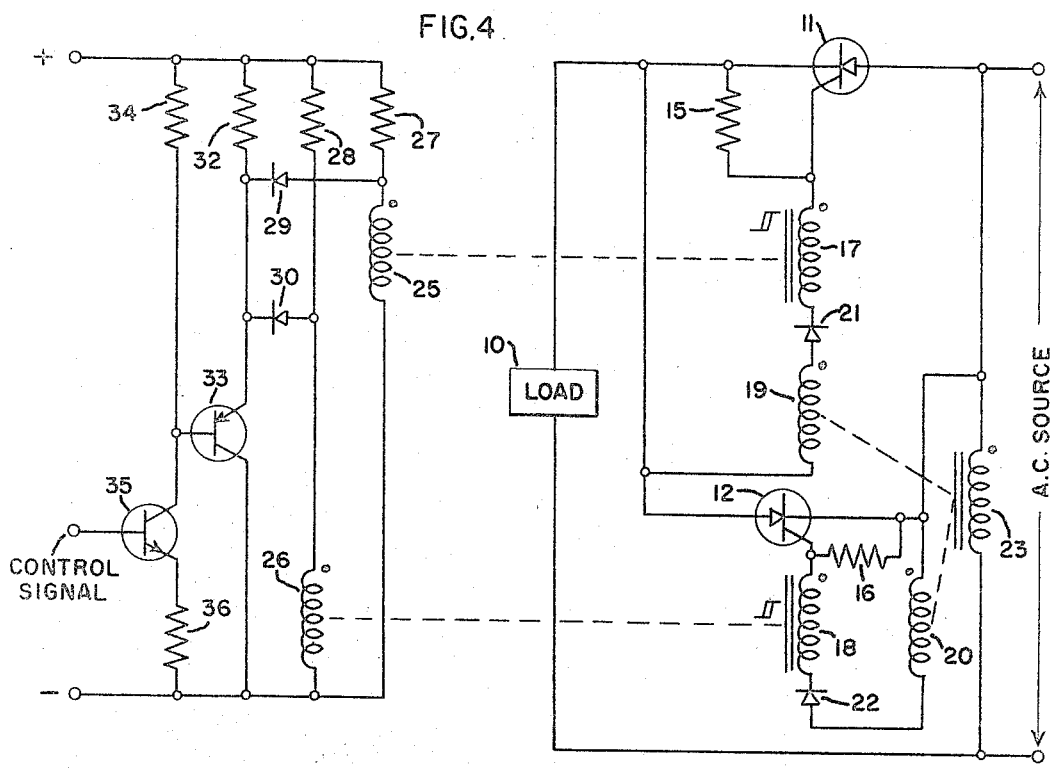

July 18, 1967  E. H. DINGER  3,331,999
ALTERNATING CURRENT VOLTAGE CONTROL ARRANGEMENT
Filed July 5, 1963  7 Sheets-Sheet 4
FIG.6
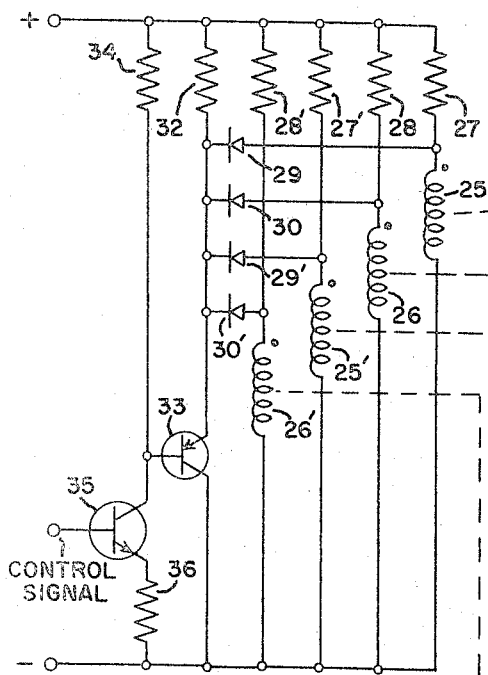
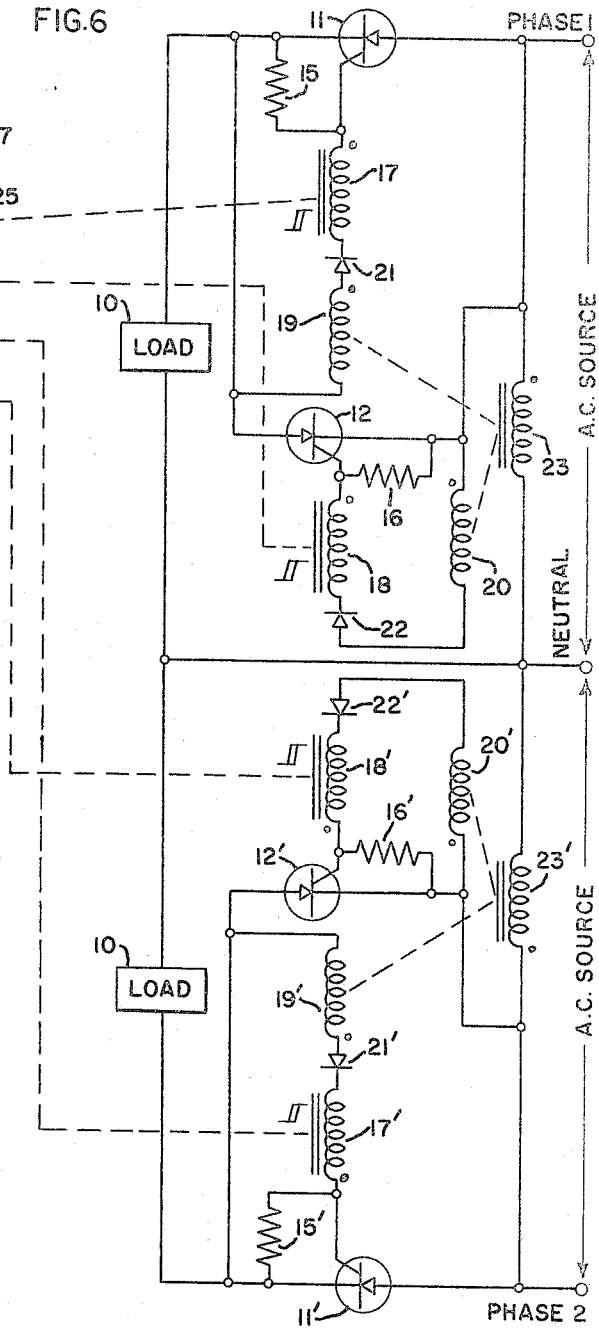
INVENTOR:
EDWARD H. DINGER,
BY *James J. Williams*
HIS ATTORNEY.

July 18, 1967 E. H. DINGER 3,331,999
ALTERNATING CURRENT VOLTAGE CONTROL ARRANGEMENT
Filed July 3, 1963 7 Sheets-Sheet 7

INVENTOR:
EDWARD H. DINGER,
BY James J Williams
HIS ATTORNEY.

United States Patent Office 3,331,999
Patented July 18, 1967

3,331,999
ALTERNATING CURRENT VOLTAGE CONTROL ARRANGEMENT
Edward H. Dinger, Waynesboro, Va., assignor to General Electric Company, a corporation of New York
Filed July 3, 1963, Ser. No. 292,599
11 Claims. (Cl. 318—327)

The invention relates to an arrangement for controlling alternating current voltage, and particularly to an arrangement for controlling the application of an alternating current voltage to a load.

It is sometimes desirable that single-phase or multiphase alternating current loads be controlled or supplied with variable amounts of power. This may be achieved by the application of the single-phase or multiphase alternating current voltage to the load at desired times in the cycles of the alternating current voltage.

An object of the invention is to provide an improved arrangement for supplying single-phase or multiphase alternating current voltage to a load.

Another object of the invention is to provide an improved arrangement for supplying single-phase or multiphase alternating current voltage to a load at desired times.

The alternating current voltage is preferably applied to the load at the same relative time in each half cycle of the voltage to prevent a net direct current from flowing in the load.

Therefore, another object of the invention is to provide an arrangement for supplying single-phase or multiphase alternating current voltage to a load at the desired and same relative time in each half cycle of the alternating current voltage.

Briefly, these and other objects of the invention are achieved by current control devices coupled between the source of alternating current voltage and the load. The current control devices are rendered conductive by individual signals which are applied at times determined by the saturation of saturable reactors in the set direction. Each of the reactors is reset toward saturation in the reset direction by a common control signal. Thus, voltage is applied to the load at the same relative time for each half cycle so that no net direct current flows in the load.

Another object of the invention is to provide an arrangement that resets a plurality of saturable reactors by equal increments, despite differences in the characteristics of the reactors.

The invention is particularly pointed out in the claims. The invention may be better understood from the following description given in connection with the accompanying drawings, in which:

FIGURE 3 shows hystersis loops for explaining the resetting of the saturable reactors of FIGURE 1;

FIGURE 4 shows another embodiment of the invention used with a single-phase alternating current source and load;

FIGURES 5 and 6 show embodiments of the invention used with a two-phase alternating current source and load;

Figure 1:
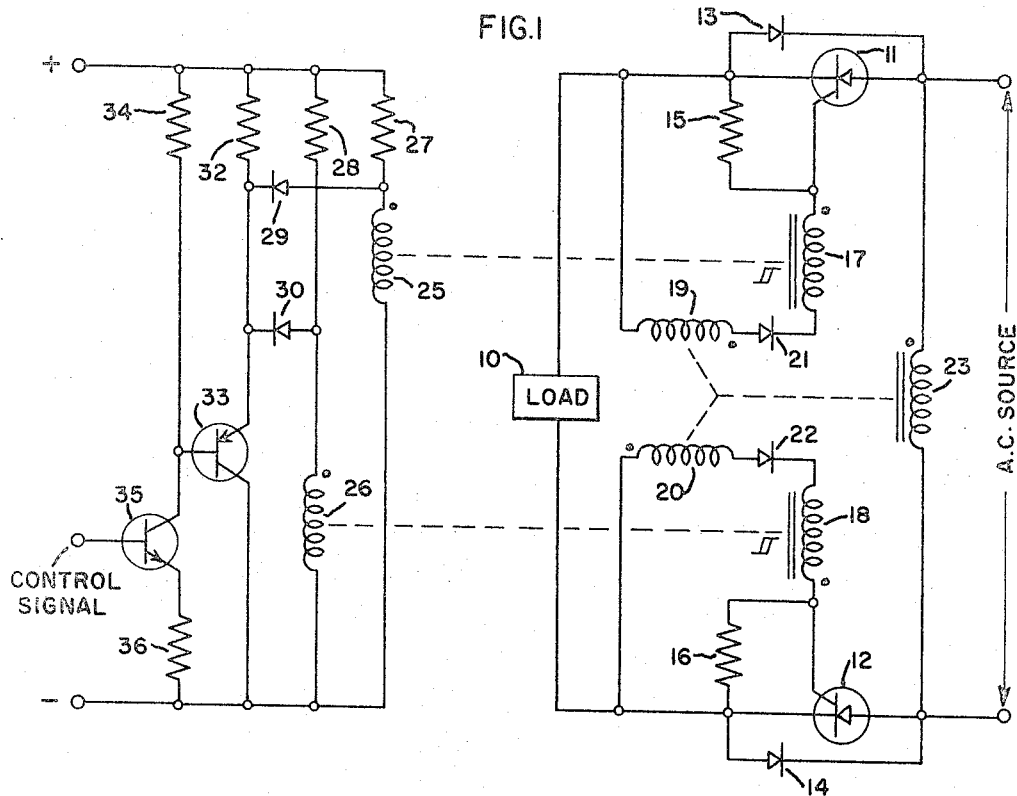
FIGURE 1 shows an embodiment of the invention used with a single-phase alternating current source and load.

In FIGURE 1, a single-phase load 10 is to be supplied with alternating current voltage at desired times from a single-phase alternating current source. The alternating current source is connected to the load 10 through suitable current control devices such as silicon controlled rectifiers 11, 12. The silicon controlled rectifiers 11, 12 are known in the art. These rectifiers 11, 12 include an anode, a cathode, and a gate or control electrode. When the anode of such a rectifier is positive with respect to its cathode, it may conduct main current from its anode to its cathode in response to a current flow into its control electrode. Once main current flows from the anode to the cathode, this main current can be stopped only by reducing the positive voltage of the anode relative to the cathode to some predetermined level. The anode-cathode paths of the two control rectifiers 11, 12 are coupled in series between the source terminals and the load 10 in opposite current conducting directions. Expressed in another way, both control rectifiers 11, 12 conduct current from the source to the load 10. That is, if one control rectifier 11 conducts current from its source terminal toward the load 10, the other rectifier 12 must likewise conduct current from its source terminal toward the load 10. However, the control rectifiers 11, 12 may both conduct current in the opposite direction from the load 10 toward the source terminals. Power rectifiers 13, 14 each having an anode and a cathode are respectively coupled in parallel with the anode-cathode paths of the control rectifiers 11, 12 to conduct current in the opposite direction or sense relative to the current conducting direction of the control rectifiers 11, 12. Suitable shunt resistors 15, 16 may be respectively coupled between the control electrode and cathode of each of the control rectifiers 11, 12 to prevent premature firing of the control rectifiers 11, 12 in response to exciting current. A series circuit is coupled between the control electrode and cathode of each of the control rectifiers 11, 12. The series circuit coupled to the control rectifier 11 includes a set winding 17, an exciting winding 19, and a set rectifier 21. The set winding 17 is coupled to the core of a saturable reactor which also has a reset winding 25. A dashed line between the reset winding 25 and the saturable reactor core adjacent the set winding 17 indicates that these two windings 17, 25 are tightly coupled to the same core. A similar series circuit, including a set winding 18, an exciting winding 20, and a set rectifier 22, is provided for the control rectifier 12. The set winding 18 is coupled to the core of a saturable reactor which also has a reset winding 26. A dashed line between the reset winding 26 and the saturable reactor core adjacent the set winding 18 indicates that these two windings 18, 26 are tightly coupled to the same core. The saturable reactor characteristic is indicated by the square or rectangular hysteresis loops adjacent the cores. These saturable reactors have the known characteristic of being saturated in either an arbitrarily designated set or reset direction after the application of some amount of volts times seconds to their windings. The exciting windings 19, 20 are coupled to the core of an exciting transformer which has a primary winding 23 coupled across the alternating current source. A dashed line between the exciting windings 19, 20 and the core adjacent the primary winding 23 indicates that these three windings are coupled to the same core. The polarity dots beside the windings 17, 18, 19, 20, 23, 25, 26 indicate the ends of the windings having the same instantaneous and relative polarities for the respective saturable reactors and the exciting transformer. As long as the proper winding polarities are maintained, the windings 17, 18, 19, 20 and rectifiers 21, 22 of the two series circuits may be in any sequence or order. If the two series circuits do not have sufficient resistance in the set windings 17, 18 or in the exciting windings 19, 20, additional resistance should be added to limit the current between the control electrode and cathode of each of the control rectifiers 11, 12 after saturation of the set windings 17, 18.

The left-hand resetting portion of the circuit operates from a suitable source of unidirectional or direct current potential supplied to the indicated plus and minus terminals. Resistors 27, 28 of substantially equal magnitudes are respectively coupled to the plus terminal. The reset windings 25, 26 are respectively coupled between the other end of the resistors 27, 28 and the minus terminal of the direct current potential. A circuit is included to provide a voltage that is held constant at any desired value in a range of values. This circuit includes a resistor 32 and a suitable amplifier device such as a PNP amplifier transistor 33 coupled between the plus and minus terminals of the direct current potential. The emitter of the amplifier transistor 33 is coupled to the resistor 32, and the collector of the amplifier transistor 33 is coupled to the minus terminal. Reset rectifiers 29, 30 respectively couple the junction of the resistor 27 and the reset winding 25 and the junction of the resistor 28 and the reset winding 26 to the emitter of the amplifier transistor 33. A control circuit including a resistor 34, a current control device such as an NPN control transistor 35 and a resistor 36 are also coupled between the plus and minus terminals. The collector of the control transistor 35 is coupled to the base of the amplifier transistor 33. A suitable control signal is applied to the base of the control transistor 35.

Figure 2:
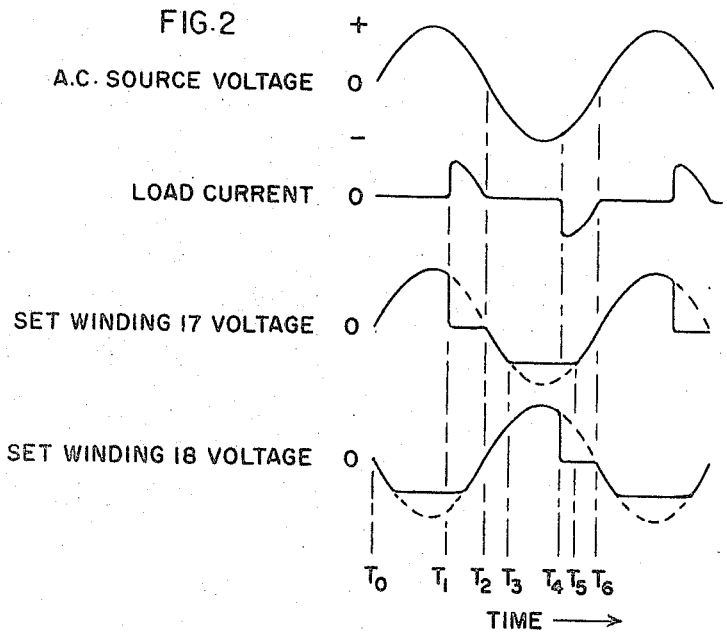
FIGURE 2 shows waveforms for explaining the operation of the alternating current voltage control of FIGURE 1.

The operation of the embodiment shown in FIGURE 1 will be explained in connection with the waveforms shown in FIGURE 2. The waveforms shown in FIGURE 2 are plotted along a common time axis, and show, from top to bottom, the voltage of the alternating current source of the upper source terminal with respect to the lower source terminal, the load current, the voltage across the set winding 17, and the voltage across the set winding 18. Assume that at some time prior to time $T_0$, the saturable reactors have been reset equal increments or amounts. At time $T_0$, the upper source terminal begins to go positive in a sinusoidal manner with respect to the lower terminal, and forwardly bias the anode-cathode path of the control rectifier 11. At the same time, the dotted end of the primary winding 23 likewise goes positive. This in turn causes the dotted ends of the exciting windings 19, 20 to also go positive. The set rectifier 22 prevents this positive voltage on the exciting winding 20 from having any effect. However, the set rectifier 21 permits a set current to flow from the dotted end of the exciting winding 19 through the set rectifier 21, through the set winding 17, and through the resistor 15 back to the undotted end of the exciting winding 19. This produces the voltage across the set winding 17 as indicated in the waveform. It has been assumed for purposes of illustration that the saturable reactor associated with the set winding 17 becomes fully set at time $T_1$. When this saturable reactor becomes fully set, the voltage across the set winding 17 falls almost to zero. At the same time that this saturable reactor becomes fully set, it permits a relatively large current to flow through the series circuit path just mentioned. This current causes the control rectifier 11 to conduct. Thus, at the time $T_1$, load current flows through the control rectifier 11, the load 10, and the power rectifier 14. This load current continues until the alternating current source voltage reaches zero and reverse polarity at time $T_2$, which is at 180° of the alternating current source cycle.

At the time $T_2$, the reversal of the alternating current source voltage causes the control rectifier 11 to stop conduction. The lower terminal of the alternating current source becomes positive with respect to the upper terminal of the alternating current voltage source. The undotted end of the primary winding 23 becomes positive with the result that set current begins to flow in the series circuit from the undotted end of the exciting winding 20 through the set rectifier 22, through the set winding 18, and through the resistor 16 back to the dotted end of the exciting winding 20. This causes the saturable reactor associated with the set winding 18 to become fully set at the time $T_4$ which corresponds to the time $T_1$ in the previous half cycle. The control rectifier 12 conducts and current flows in the opposite direction through the load 10 and the main rectifier 13 until the time $T_6$. This operation is similar to that just given for the half cycle between the time $T_0$ and $T_2$.

Between the times $T_2$ and $T_6$, the undotted end of the exciting winding 19 is positive with respect to its dotted end. The set rectifier 21 prevents any set current from flowing as a result of this voltage. The reset winding 25 however is always supplying a reset voltage to its associated saturable reactor. This reset voltage is determined by the magnitude of the control signal supplied to the control transistor 35 and amplified by the amplifier transistor 33. However, the set winding 17 does not indicate this reset voltage immediately because it is held or clamped by the voltage applied to the exciting winding 19. Hence, the set winding 17 reverses voltage from zero toward a negative value between the times $T_2$ and $T_3$ in a sinusoidal fashion, since the voltage in the exciting winding 19 is a stiffer or predominating voltage. At the time $T_3$, the conditions are such that the saturable reactor associated with the windings 17, 25 becomes reset at the rate indicated by the level of the amplified control signal applied to the reset winding 25. Hence, the voltage across the set winding 17 remains constant between the times $T_3$ and $T_5$ because the set winding 17 is tightly coupled to the reset winding 25 by a fixed turns ratio. At the time $T_5$, the voltage across the set winding 17 follows the alternating current source voltage back toward zero because of the stiffer or predominating voltage supplied to the exciting winding 19 by the alternating current source as mentioned for the interval between the times $T_2$ and $T_3$. At time $T_6$, the cycle repeats itself in the manner already indicated beginning at time $T_0$.

It will thus be seen that sometime during the half cycle between the times $T_0$ and $T_2$, the saturable reactor associated with the windings 17, 25 becomes fully set and permits current to flow through the load while the saturable reactor associated with the windings 18, 26 becomes reset. During the next half cycle between the times $T_2$ and $T_6$, the saturable reactor associated with the windings 17, 25 becomes reset and the saturable reactor associated with the windings 18, 26 becomes fully set and permits current to flow. Resetting during appropriate half cycles is achieved when the set rectifiers 21, 22 are nonconductive so that reset current in the reset windings 25, 26 can reset their respective saturable reactors. Setting is achieved during appropriate half cycles, despite the flow of current in the reset windings 25, 26, by making the resistance in the set windings 17, 18 much less than the resistance in the respective reset windings 25, 26, the resistances of both windings being referred to the same winding. The amount or degree of reset of the saturable reactors determines when they subsequently become fully set because the curve for the set winding 17 between the times $T_0$ and $T_2$ must equal the volts times seconds area under the curve for the set winding 17 between times $T_2$ and $T_6$ (for the preceding half cycle). The same is true for the curve for the set winding 18. This amount or degree of reset determines the amount of power supplied to the load. The amount or degree of reset can be varied between the limits of no power supplied to the load during each half cycle or continuous and full power supplied to the load during each half cycle.

It is desirable that the total load current or power in one direction through the load 10 be equal to the total load current or power in the opposite direction through the load 10 to prevent a net direct current from flowing through the load 10. Such a net direct current is undesirable or harmful to many alternating current machines such as an induction motor. Therefore, it is desirable, if not essential, that each of the saturable reactors be reset the same amount or increment from its position of saturation in the set direction. One way of obtaining these equal increments of reset is to provide saturable reactors and windings having the same or identical characteristics. However, this can be expensive because it requires close manufacturing tolerances and limitations. The reset circuit shown in the left-hand portion of FIGURE 1 permits saturable reactors of considerably different characteristics and tolerances to be reset by equal amounts or increments. The problem can be better appreciated by an examination of FIGURE 3. FIGURE 3 shows two hysteresis loops or curves for two saturable reactors, such as the two saturable reactors in FIGURE 1. One saturable reactor may have the hysteresis loop indicated by the solid line loop of FIGURE 3 and the other saturable reactor may have the hysteresis loop indicated by the dashed line loop shown in FIGURE 3. At a time just prior to reset, the saturable reactors may be set to the degree indicated by the respective points 42, 43 for the two loops. It is desirable that they be reset by equal amounts or increments $\Delta\phi$. Thus, for a given condition, the dashed line hysteresis loop should be reset to the point 44 and the solid line hysteresis loop should be reset to the point 45 such that the $\Delta\phi$ increment for the solid line loop equals the $\Delta\phi$ increment for the dashed line loop. The left-hand portion of the circuit of FIGURE 1 accomplishes this.

This equal resetting is accomplished by the use of the constant voltage circuit. The resistors 27, 28 are chosen so that they would permit more than the maximum or necessary resetting current to flow through their respective reset windings 25, 26. The excess current available through these resistors 27, 28 and windings 25, 26 would ordinarily tend to reset the saturable reactors at a maximum rate. However, the lower ends of these resistors 27, 28 are coupled through respective reset rectifiers 29, 30 to the emitter of the amplifier transistor 33 in the constant voltage circuit. The amplifier transistor 33 acts as a low impedance voltage source. That is, the transistor 33 absorbs any excess current which is not taken or needed by the reset windings 25, 26 without appreciable change of voltage at its emitter. Interaction between these excess currents is prevented by the reset rectifiers 29, 30 so that any excess currents flow through the emitter-collector path of the amplifier transistor 33. The level or voltage at which excess current flows through the transistor 33 is determined by the control transistor 35. And, this level or voltage is determined by a control signal. The control signal determines the voltage level for the amplifier transistor 33. Thus, the reset portion of the circuit shown in FIGURE 1 assures that each of the saturable reactors is reset by the same increment or amount, despite differences in the characteristics of the saturable reactors and in the resistors 27, 28. As will be shown, this reset circuit can be utilized with any number of reset windings.

FIGURE 4 shows another embodiment of the invention used with a single-phase alternating current source and load. The embodiment of FIGURE 4 is similar to the embodiment of FIGURE 1, and corresponding elements have been given the same reference numerals. The power rectifiers 13, 14 are not used, and the control rectifiers 11, 12 have been coupled with their anode-cathode paths in parallel with each other in opposite current conducting directions in a single side or line between the alternating current source and load 10. Each of the control rectifiers 11, 12 may have the shunt resistors 15, 16, and is provided with the series circuits, the resetting circuits, and the primary winding 23 which operate in the same fashion as the embodiment of FIGURE 1. The main difference is that the control rectifiers 11, 12 conduct all of the load current. When the upper terminal of the alternating current source is positive, the control rectifier 11 conducts current through the load 10 to the other terminal, and when the lower terminal of the alternating current source is positive, current passes from this lower terminal through the load 10 and the control rectifier 12 to the upper terminal.

Figure 5:
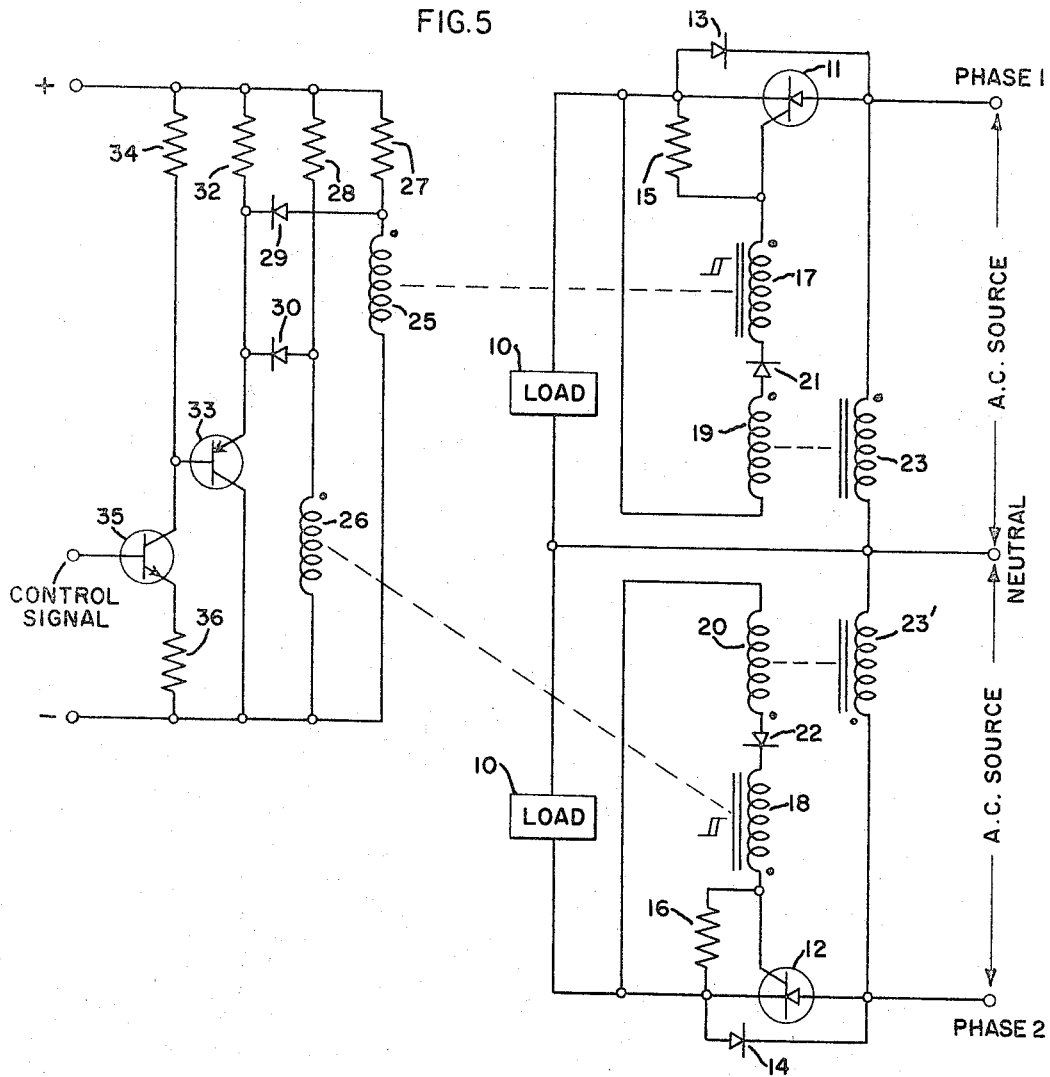

FIGURE 5 shows another embodiment of the invention used with a two-phase alternating current source and load 10. The two-phase source is supplied from the terminals indicated as phase 1 and phase 2 and also a neutral. The load 10 is indicated as being a two-phase load by two rectangles respectively coupled between the two phases and the neutral. Current in phase 1 flows to and from the load 10 through the control rectifier 11 and the power rectifier 13, and current to and from phase 2 flows to and from the load 10 through the control rectifier 12 and the power rectifier 14. The exciting winding 19 is coupled to the primary winding 23 coupled between phase 1 and neutral, and the exciting winding 20 is coupled to the primary winding 23' coupled between phase 2 and neutral. The additional primary winding 23' is needed to provide an exciting voltage in the proper phase relation with phase 2. The remainder of the circuit of FIGURE 5 is similar to the circuit of FIGURE 1 as indicated by the corresponding reference numerals. The operation of the two-phase circuit shown in FIGURE 5 is also similar to the operation of the single-phase circuit shown in FIGURE 1 but on a two-phase basis. The reset circuit assures that the saturable reactors are reset by the same amount or increment so that the respective control rectifiers 11, 12 conduct at the same corresponding times in their respective phases. Each phase of the circuit of FIGURE 5 operates as the single-phase circuit of FIGURE 1, except that no control elements are needed in the neutral. Because of the neutral and the power rectifiers 13, 14, there is always a minimum amount of current that flows through the load 10. With this current flow, even if the saturable reactors are fully reset, they cannot become fully set and fire the control rectifiers 11, 12.

FIGURE 6 shows another embodiment of the invention used with a two-phase alternating current source and load. The embodiment of FIGURE 6 bears the same relationship to the embodiment of FIGURE 5 as the embodiment of FIGURE 4 bears to the embodiment of FIGURE 1. That is, the embodiment of FIGURE 6 provides the control rectifiers in parallel with each other and in series with the respective lines rather than using the control rectifiers and power rectifiers. The embodiment of FIGURE 6 also utilizes additional reset windings so that each saturable reactor is provided with its individual and respective reset voltage. However, all of these reset windings can be operated or supplied from the constant voltage circuit which includes the amplifier transistor 33 that is coupled to the control transistor 35. The elements of FIGURE 6 have the same reference numerals as the elements of FIGURE 5. Additional elements are provided with the same reference numerals followed by a prime. Each phase of the circuit of FIGURE 6 operates as the single phase of FIGURE 4.

Figure 7:
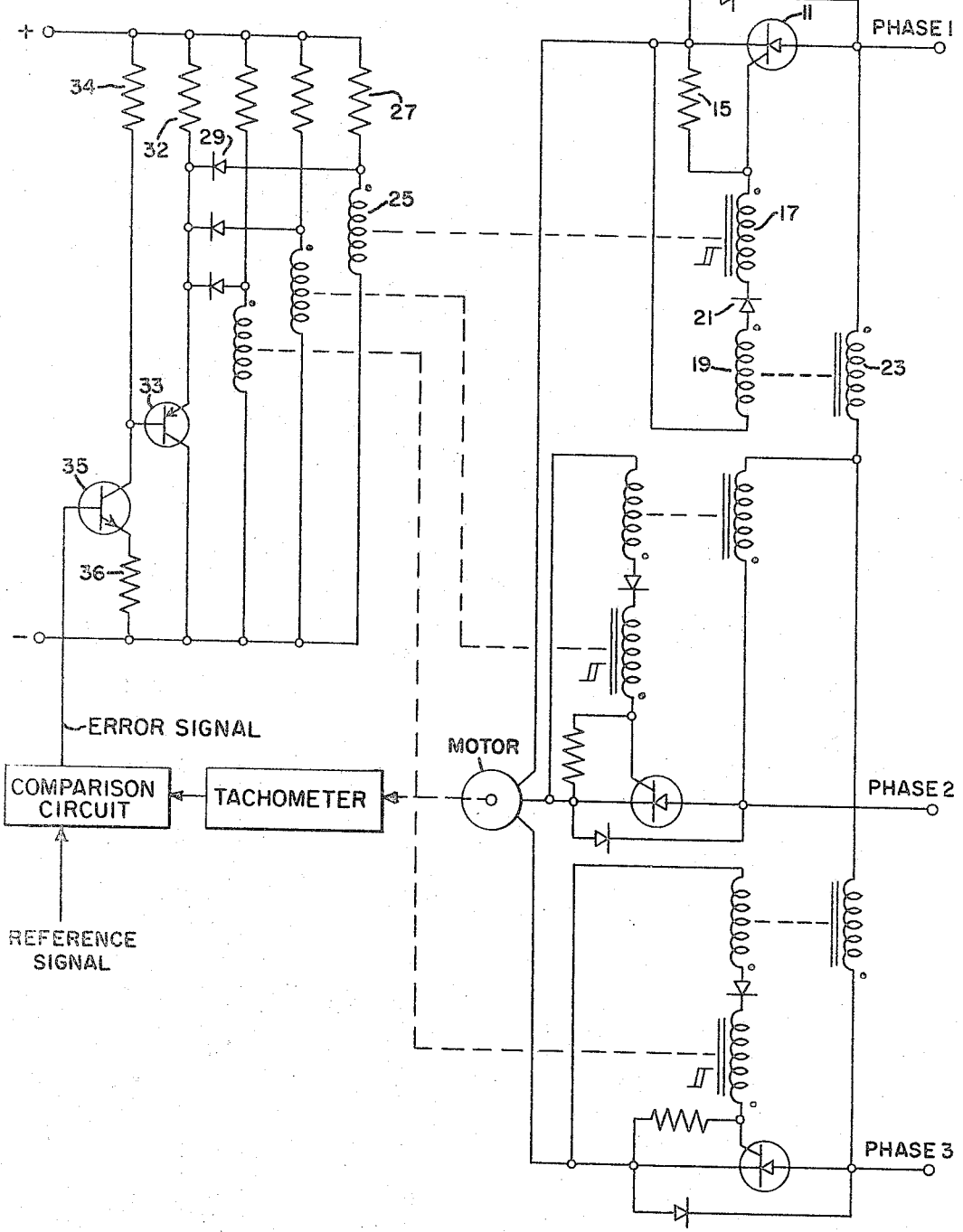
FIGURES 7 and 8 show embodiments of the invention used with a three-phase alternating current source and load.

FIGURE 7 shows another embodiment of the invention used with a three-phase alternating current source and a three-phase motor as a load. Only part of the circuit has been provided with reference numerals since the other parts are similar and perform the same function during corresponding times of their respective phases. Each phase of the circuit of FIGURE 7 operates as the single-phase circuit of FIGURE 1. The arrangement of FIGURE 7 shows a three-phase motor as the load, the shaft or output of this motor being coupled to a tachometer as indicated by the dashed lines. The tachometer can be any suitable type which provides a signal indicative of the motor speed. This signal is supplied to a comparison circuit where it is compared with a reference signal. The comparison circuit produces an error signal having a suitable polarity and magnitude indicative of the relative magnitudes of the reference signal and the tachometer signal. This error signal is applied to the control transistor 35 as a control signal. The error signal thus provides a signal which determines the reset of the saturable reactors so that the speed of the motor can be controlled and maintained at any desired level determined by the setting of the reference signal. If the motor tends to rotate too fast, an increased error signal is produced which causes greater resetting, and hence results in less power being supplied to the motor. Conversely, if the motor tends to rotate too slowly, a decreased error signal is produced which causes less resetting of the saturable reactors, and hence results in a greater amount of power being supplied to the motor. The motor shown in FIGURE 7 may be either delta connected or Y connected.

Figure 8:
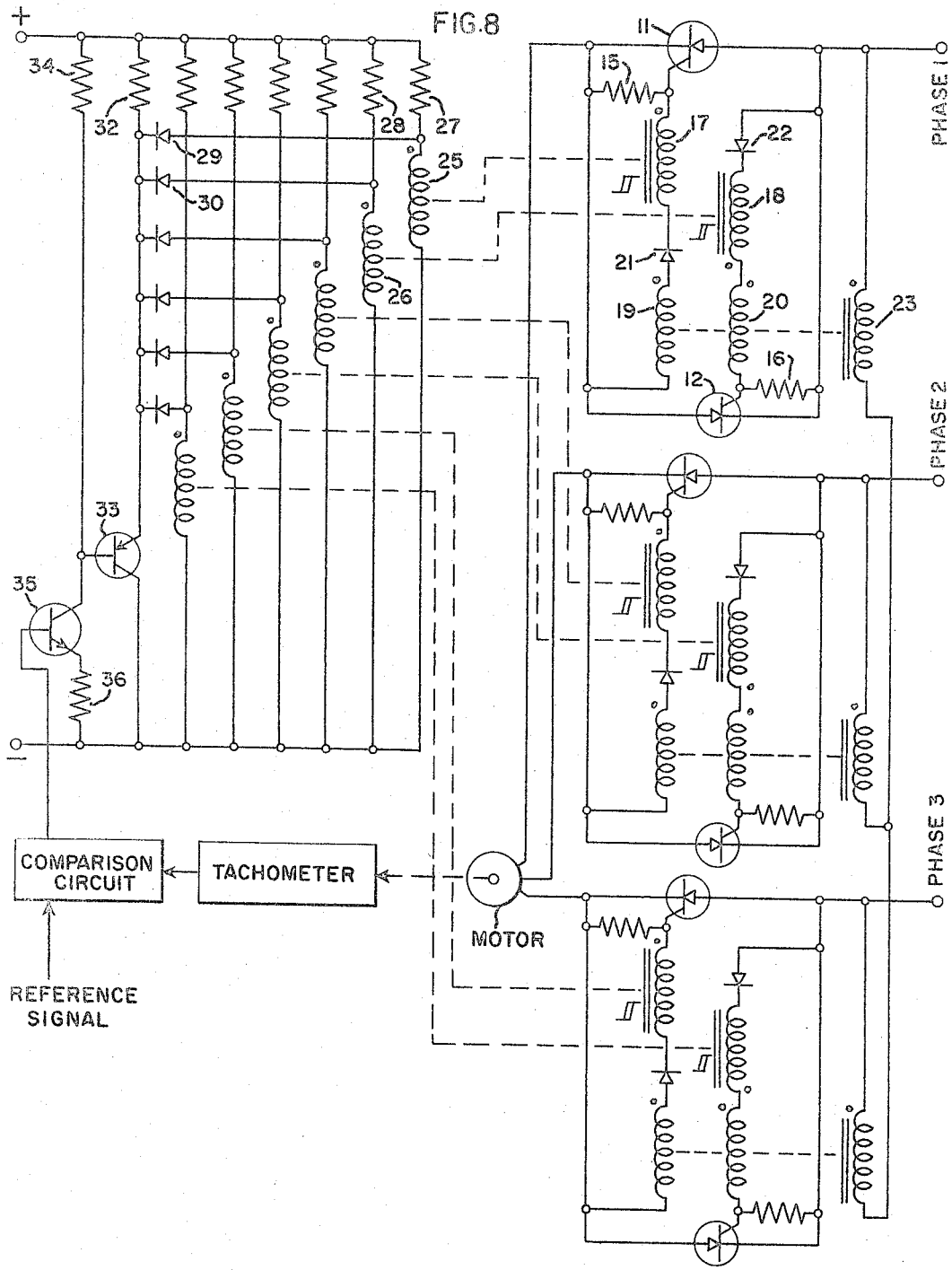

FIGURE 8 shows another embodiment of the invention used with a three-phase alternating current source and motor. The embodiment of FIGURE 8 bears the same relation to the embodiment of FIGURE 7 as FIGURE 6 does to FIGURE 5, and FIGURE 4 does to FIGURE 1. Each phase of the circuit of FIGURE 8 operates as the single phase of FIGURE 4. Only part of the circuit has been provided with refernece numerals since the other parts are similar. The embodiment of FIGURE 8 has been shown with the same motor, the tachometer, the comparison circuit, and the reference signal as shown in FIGURE 7.

Figure 9:
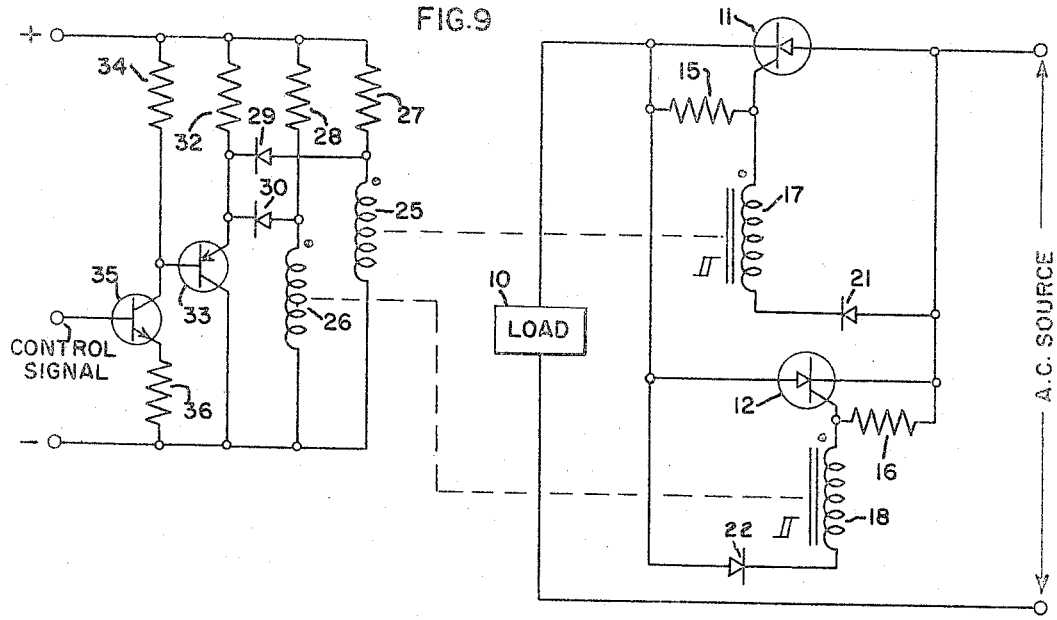
FIGURE 9 shows another embodiment of the invention used with a single-phase alternating current source and load.
Figure 10:
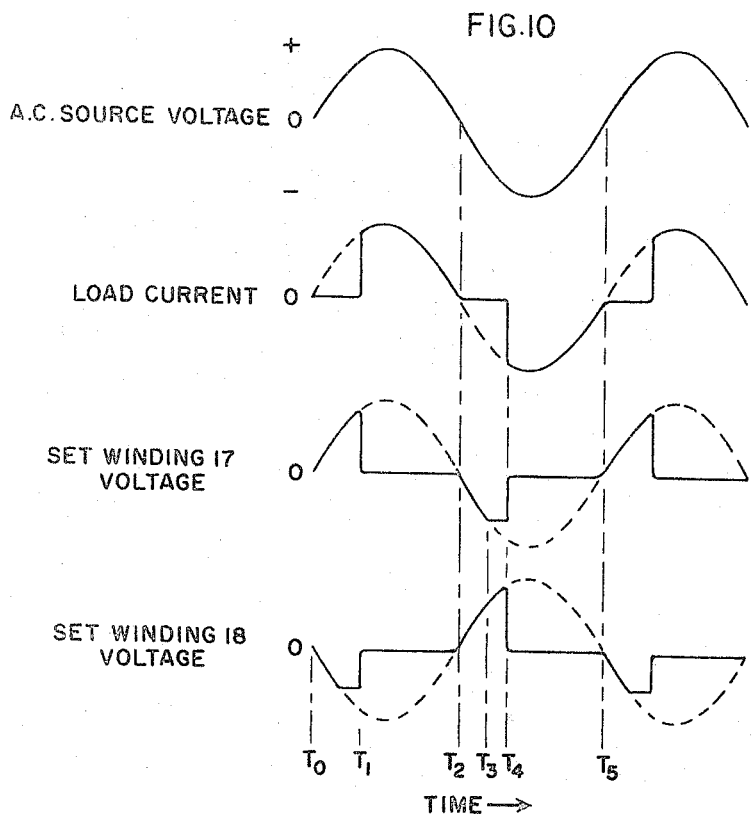
FIGURE 10 shows waveforms for explaining the operation of the alternating current voltage control of FIGURE 9.

FIGURE 9 shows another embodiment of the invention used with a single-phase alternating current source and load. FIGURE 9 differs from the previous embodiments shown in that it does not utilize the primary winding 23 and its coupled exciting windings 19, 20. Instead, the embodiment shown in FIGURE 9 uses what is called or termed anode firing of the control rectifiers 11, 12. Such anode firing can be utilized only in embodiments in which the control rectifiers 11, 12 are coupled in parallel with each other. Thus the embodiment of FIGURE 9 is similar to the embodiment of FIGURE 4, and can be used in similar fashion in the embodiments of FIGURES 6 and 8. The series circuit for setting and firing the control rectifiers 11, 12 does not require the exciting windings 19, 20. Instead, the series circuits include the set rectifiers 21, 22 and the set windings 17, 18 coupled between the anode and control electrode of each of the rectifiers 11, 12 respectively. Thus, the exciting current is provided directly from the alternating current source and flows through the load 10. For example, when the upper terminal of the alternating current source is positive, the exciting current flows through the set rectifier 21, through the set winding 17, through the resistor 15, and through the load 10. This set current sets the saturable reactor which then causes the control rectifier 11 to fire. During this same half cycle, the saturable reactor associated with the set winding 18 is being reset. Then, during the next half cycle, the saturable reactor associated with the set winding 17 becomes reset, and the control rectifier 12 conducts. FIGURE 10 shows waveforms plotted along a common time axis illustrating this operation. The waveforms shown in FIGURE 10 correspond to the waveforms shown in FIGURE 2, and hence will not be explained in detail. The embodiment shown in FIGURE 9 may be used in any number of phases in circuits or arrangements similar to FIGURES 6 and 8. The embodiment shown in FIGURE 9 cannot be utilized in circuits similar to FIGURES 1, 5, and 7 since these circuits have the power rectifiers in parallel with the control rectifiers, and the power rectifiers would prevent resetting.

The invention has been explained in connection with a number of embodiments including one, two, and three-phase systems. However, it is to be understood that the invention can be used with any number of phases by providing the appropriate circuitry. And, the resetting portion of the circuit can reset any number of saturable reactors by the same increment or amount. However, these and other modifications will be apparent to persons skilled in the art. Therefore, while the invention has been described with reference to a particular embodiment, it is to be understood that modifications may be made without departing from the spirit of the invention or from the scope of the claims.

What I claim as new and desire to secure by Letters Patent of the United States is:

1. An arrangement for controlling the alternating voltage supplied to a load comprising a plurality of controlled switching devices each coupling the source of said alternating voltage to said load, each of said controlled switching devices having a control electrode, current conducting means coupled to said load and said source of alternating voltage to provide a return path for current flow, a plurality of saturable reactors each having a set winding and a reset winding, a plurality of rectifiers, means coupling one of said set windings and one of said rectifiers with the control electrode of one of said controlled switching devices to form a respective control circuit for each of said controlled switching devices, means coupling said source of alternating voltage to each of said control circuits, each of said rectifiers being oriented to permit current to flow through the set winding coupled thereto to set the saturable reactor and subsequently into the control electrode of the associated controlled switching device to trigger the controlled switching device on during the half cycle of said alternating voltage when said controlled switching device is forward biased, a constant voltage source, and a plurality of clamping means, each of reset windings being coupled by a respective one of said clamping means to said constant voltage source so that each of said saturable reactors is reset equally.

2. An arrangement as recited in claim 1 wherein said means coupling said suorce of alternating voltage to each of said control circuits includes a transformer having a number of primary windings equal in number to the phases of said alternating voltage and coupled thereto, and a number of secondary windings equal in number to said plurality of saturable reactors, one of said secondary windings being coupled to each of said set windings.

3. An arrangement as recited in claim 2 wherein said current conducting means includes a plurality of rectifiers each being respectively coupled across one of said controlled switching devices and oriented to conduct current in a direction opposite to the current conducted by the controlled switching device in parallel therewith.

4. An arrangement as recited in claim 2 wherein said controlled switching devices are arranged in pairs, each controlled switching device being coupled in parallel with and in opposite current conducting direction to its paired controlled switching device.

5. An arrangement as recited in claim 1 further including a source of direct voltage, and a plurality of resistors, each of said resistors respectively coupling one of said reset windings to said source of direct voltage, and wherein said clamping means are rectifiers individually coupling each of said reset windings to said constant voltage source, said rectifiers being oriented so that each reset winding is clamped to the voltage of said constant voltage source.

6. An arrangement as recited in claim 5 wherein said constant voltage source is adjustable, and there is further included feedback means coupled to said load and said constant voltage source, and control means coupling said feedback means to said constant voltage source to adjust the voltage level of said constant voltage source in accordance with the difference between the alternating voltage applied to said load and the alternating voltage that is desired for said load.

7. An arrangement as recited in claim 6 wherein said load is a motor and said feedback means includes means for sensing the speed of said motor and generating a voltage proportional thereto, means for generating a speed reference voltage, and a comparison circuit for comparing the voltage proportional to motor speed with said speed reference voltage to obtain an error voltage, said control means coupling said comparison circuit to said constant voltage source to adjust the voltage thereof in proportion to said error voltage, whereby said saturable reactors are reset an amount determined by said error voltage, said saturable reactors are accordingly set at a time in each half cycle of said alternating voltage related to said error voltage so that said controlled switching devices are alternately turned on and said alternating voltage applied to said load for that portion of each half cycle determined by said error voltage.

8. In an arrangement for controlling the alternating voltage applied to a load of the type including a plurality of controlled switching devices coupling the source of alternating voltage to said load, wherein each of said controlled switching devices has a control electrode, a plurality of saturable reactors each having a set winding and a reset winding, a plurality of rectifiers individually coupling each of said set windings to the control electrode of each of said controlled switching devices, wherein each of said rectifiers is oriented to permit current to flow into the control electrode of the controlled switching device coupled thereto when the associated saturable reactor is set, and means coupling said source of alternating voltage to each of said set windings so that each of said saturable reactors will be set during that half cycle of said alternating voltage when the associated rectifier is forward biased, the improvement to insure that equal portions of said alternating voltage is applied to said load during each half cycle comprising a source of constant voltage, a plurality of clamping means individually coupling each of said reset windings to said source of constant voltage so that said saturable reactors are reset equal amounts, whereby each of said saturable reactors is set at the same time during each half cycle and said controlled switching devices are alternately turned on at the same time during each half cycle.

9. The improvement for an arrangement for controlling the alternating voltage to a load as recited in claim 8 further including a source of direct voltage, and a plurality of resistors, each of said resistors respectively coupling one of said reset windings to said source of direct voltage, and wherein said clamping means are rectifiers individually coupling each of said reset windings to said source of constant voltage, said rectifiers being oriented so that each reset winding is clamped to the voltage of said source of constant voltage.

10. An arrangement for controlling the speed of an alternating current motor comprising a source of alternating voltage, a plurality of controlled switching devices each coupling said source of alternating voltage to said motor, each of said controlled switching devices having a control electrode, current conducting means coupled to said motor and said source of alternating voltage to provide a return path for current flow, a plurality of saturable reactors each having a set winding and a reset winding, a plurality of rectifiers individually coupling each of said set windings to the control electrode of each of said controlled switching devices, each of said rectifiers being oriented to permit current to flow into the control electrode of the controlled switching device coupled thereto when the associated saturable reactor is set, means coupling said source of alternating voltage to each of said set windings so that each of said saturable reactors will be set during that half cycle of said alternating voltage when the associated rectifier is forward biased, a source of constant voltage, a plurality of clamping means individually coupling each of said reset windings to said source of constant voltage so that said saturable reactors are reset equal amounts, means for sensing the speed of said motor and generating a voltage proportional thereto, means for generating a speed reference voltage, a comparison circuit for comparing the voltage proportional to motor speed with said speed reference voltage to obtain an error voltage, and control means coupling said comparison circuit to said source of constant voltage to adjust the voltage thereof in proportion to said error voltage, whereby said saturable reactors are reset an amount determined by said error voltage, said saturable reactors are accordingly set to turn on said controlled switching devices at a time during each half cycle determined by said error voltage and said alternating voltage is applied to said motor at that time in each half cycle determined by said error voltage.

11. An arrangement for controlling the setting of a plurality of saturable reactors comprising a source of direct voltage, a source of constant voltage, a plurality of resistors, each of said saturable reactors having a set winding and a reset winding, each of said resistors individually coupling each of said reset windings to said source of direct voltage, a plurality of rectifiers, each of said reset windings being coupled to said source of constant voltage by one of said rectifiers, said rectifiers being oriented to clamp said reset windings to the voltage of said source of constant voltage so that said saturable reactors are reset equal amounts whereby each saturable reactor will be set after equal periods of application of a given voltage to said set windings.

References Cited

UNITED STATES PATENTS

| | | | |
|---|---|---|---|
| 2,998,547 | 8/1961 | Berman | 315—200 |
| 3,019,355 | 1/1962 | Morgan | 307—88.5 |
| 3,154,695 | 10/1964 | MacGregor | 307—88.5 |

JOHN F. COUCH, *Primary Examiner.*

K. D. MOORE, *Assistant Examiner.*